(12) United States Patent (10) Patent No.: US 11,489,903 B2
Cumaranatunge et al. (45) Date of Patent: Nov. 1, 2022

(54) DEVICES AND METHOD FOR VOICE OVER INTERNET PROTOCOL CALL CONTINUITY

(71) Applicant: Infinite Convergence Solutions, Inc., Arlington Heights, IL (US)

(72) Inventors: Tharusha Cumaranatunge, Palatine, IL (US); Matthew Kelliher, Chicago, IL (US); Mukesh Phadtare, Elk Grove Village, IL (US)

(73) Assignee: Infinite Convergence Solutions, Inc., Arlington Heights, IL (US)

( * ) Notice: Subject to any disclaimer, the term of this patent is extended or adjusted under 35 U.S.C. 154(b) by 0 days.

(21) Appl. No.: 17/178,699

(22) Filed: Feb. 18, 2021

(65) Prior Publication Data

US 2021/0218791 A1 Jul. 15, 2021

Related U.S. Application Data

(63) Continuation of application No. 16/450,674, filed on Jun. 24, 2019, now Pat. No. 10,598,706.

(60) Provisional application No. 62/754,617, filed on Nov. 2, 2018.

(51) Int. Cl.
*H04L 65/80* (2022.01)
*H04L 65/60* (2022.01)
*H04L 65/1046* (2022.01)
*H04L 65/1101* (2022.01)

(52) U.S. Cl.
CPC .......... *H04L 65/80* (2013.01); *H04L 65/1046* (2013.01); *H04L 65/1101* (2022.05); *H04L 65/60* (2013.01)

(58) Field of Classification Search
None
See application file for complete search history.

(56) References Cited

U.S. PATENT DOCUMENTS

| | | | |
|---|---|---|---|
| 6,801,604 B2 | 10/2004 | Maes et al. | |
| 7,072,641 B2 | 7/2006 | Satapathy | |
| 8,274,970 B2 | 9/2012 | Bennett et al. | |
| 8,798,605 B2 | 8/2014 | Heit et al. | |
| 8,976,940 B2 | 3/2015 | Maxwell et al. | |
| 9,125,141 B1 | 9/2015 | Sanjeev | |
| 9,380,265 B2 | 6/2016 | Hanson et al. | |
| 9,386,622 B2 | 7/2016 | Yoon et al. | |
| 9,826,090 B2 | 11/2017 | Spiessbach et al. | |
| 10,033,847 B2 | 7/2018 | Osman et al. | |
| 2003/0185160 A1 | 10/2003 | Tegethoff | |
| 2003/0223570 A1* | 12/2003 | Partanen | H04M 3/465 379/220.01 |
| 2004/0073658 A1 | 4/2004 | Oran et al. | |
| 2005/0069116 A1 | 3/2005 | Murray, II | |
| 2007/0274488 A1* | 11/2007 | Callaghan | H04W 76/19 379/201.01 |
| 2008/0037746 A1 | 2/2008 | Dufrene et al. | |
| 2008/0101247 A1 | 5/2008 | Bouchard | |
| 2010/0322388 A1 | 12/2010 | Ger | |
| 2011/0280386 A1 | 11/2011 | Fotta et al. | |

(Continued)

*Primary Examiner* — Joshua Joo
(74) *Attorney, Agent, or Firm* — Jones Day (57) ABSTRACT

This is a method, as well as a client apparatus and a server apparatus to provide call continuity and a better user experience for voice over IP calling including notification of all client devices in event of call disruption to a single client device as well as support for voice over IP calling in multi-device scenarios.

20 Claims, 7 Drawing Sheets

(56) References Cited

U.S. PATENT DOCUMENTS

| | | | |
|---|---|---|---|
| 2012/0233327 A1 | 9/2012 | Smith et al. | |
| 2012/0263287 A1* | 10/2012 | Gisby | H04M 3/56 |
| | | | 379/202.01 |
| 2013/0070755 A1 | 3/2013 | Trabeisi et al. | |
| 2013/0242775 A1 | 9/2013 | Taylor | |
| 2013/0268598 A1 | 10/2013 | Tipirneni | |
| 2013/0293665 A1 | 11/2013 | Pang | |
| 2014/0029732 A1* | 1/2014 | Liik | H04M 3/42195 |
| | | | 379/32.01 |
| 2014/0222930 A1* | 8/2014 | Gangadharan | H04L 51/04 |
| | | | 709/206 |
| 2014/0297878 A1* | 10/2014 | Minami | H04L 43/103 |
| | | | 709/227 |
| 2015/0078543 A1 | 3/2015 | Gisby et al. | |
| 2015/0230147 A1 | 8/2015 | Brownworth et al. | |
| 2015/0304603 A1 | 10/2015 | Yoon et al. | |
| 2015/0312281 A1 | 10/2015 | Martinez et al. | |
| 2016/0027134 A1 | 1/2016 | Alvarado et al. | |
| 2016/0094589 A1 | 3/2016 | Gunnalan et al. | |
| 2016/0094716 A1 | 3/2016 | Caulfield et al. | |
| 2016/0105545 A1 | 4/2016 | Filonov et al. | |
| 2016/0191573 A1 | 6/2016 | Zehavi et al. | |
| 2016/0277272 A1 | 9/2016 | Peach et al. | |
| 2016/0316414 A1 | 10/2016 | Yeoum et al. | |
| 2016/0366559 A1* | 12/2016 | King | H04W 4/029 |
| 2017/0034223 A1 | 2/2017 | Arscott et al. | |
| 2017/0041808 A1 | 2/2017 | Skeba et al. | |
| 2017/0149846 A1 | 5/2017 | Mufti et al. | |
| 2018/0198911 A1 | 7/2018 | Tamblyn et al. | |
| 2018/0270346 A1 | 9/2018 | Donnenwirth et al. | |
| 2019/0158783 A1* | 5/2019 | Dove | H04N 7/147 |
| 2019/0306252 A1 | 10/2019 | Lebedev et al. | |

\* cited by examiner

DEVICES AND METHOD FOR VOICE OVER INTERNET PROTOCOL CALL CONTINUITY

CROSS-REFERENCE TO RELATED APPLICATIONS

This application is a continuation application of and claims benefit to U.S. application Ser. No. 16/450,674 filed on Jun. 24, 2019, which claims benefit to U.S. Provisional Application 62/754,617 filed on Nov. 2, 2018, which are incorporated by reference in their entirety.

FIELD OF THE INVENTION

This relates to internet protocol voice transmission methods, clients and servers.

BACKGROUND OF THE INVENTION

Unexpected call drops and not hearing each other are frequent sources of frustration and poor user experience in voice over internet protocol (VoIP) calling. Poor coverage network areas, transition from one network to another (Wifi to cellular or vice versa) all have implications for dropped calls and/or a user experience of not hearing each other for more than many would tolerate. This innovation accepts the fact that it is unavoidable to have poor network coverage areas, network transitions etc. and provides a method by which the call continuity can be maintained to keep users engaged in the call while methods for reconnecting are being applied.

SUMMARY OF THE INVENTION

This innovation comprises a server apparatus comprising a processor coupled to the storage device, internet protocol connectivity and processor executable program code that immediately attempts to reconnects voice over IP calls that have been temporarily disconnected. This innovation also includes client devices comprising a processor coupled to the storage device, a video output, an audio output, internal protocol connectivity, and processor executable program code that receive commands to reconnect calls that may be temporarily interrupted. The innovation includes support at the client devices and server device for Multi-Device scenarios where an end user may reconnect to the voice call using a second client device. Unlike some of the prior art, such as U.S. Pat. No. 9,125,141 (Sanjeev), this innovation immediately notifies both parties that there is a connectivity problem. In contrast, the prior art waits until connectivity is restored and starts to begin calling the other person. The prior art's ability to cancel the reconnection attempt occurs later when connectivity is restored, but at that point, sufficient time may have elapsed to not want to call again and the user may not be next to the device to cancel the call, which will result in an unexpected call attempt and a poor user experience. The preferred embodiment server architecture of this solution also allows for quicker re-connection of the call (instead of reconnection to voicemail in many dropped call cases currently) and the user will be able to control the experience by canceling while the user is still engaged with the device. Also unlike the known prior art, this solution is adapted to multi-device scenarios where a user may be subscribed to multiple client devices and can be reconnected on a different client device to the same call session as may happen when a client device has a depleted battery and the user may want to reconnect to the same call using another of the same user's client devices to reconnect.

Glossary

3GPP—Third Generation Partnership Project
CallKit—A way for third-party applications (apps) to integrate with Apple™ mobile devices. Eliminates need to open a mobile device app when answering, dropping, or blocking a call.
IETF—Internet Engineering Task Force
iOS—Operating system for Apple™ mobile devices
IP—Internet Protocol
Multi-device—The use of multiple devices by a single user, such as a phone as well as a tablet or possibly a laptop software client assigned to the same user.
RFC—IETF Request for Comments Document
VoIP—Voice over IP
WebRTC—Web Real-Time Communication is a free, open-source project that provides web browsers and mobile applications with real-time communication.
Websockets—A computer communications protocol providing full duplex communication over IP as standardized by the IETF in RFC 6455.

BRIEF DESCRIPTION OF THE DRAWINGS

In FIG. 1, 101 is a client A device (named A1), 102 is a Server, and 103 is a client B device (named B1). This flow assumes a previously established call in 104, which may be established via a protocol, such as WebRTC for media (audio) and websockets for signaling, but the claims are applicable for any other protocol.

In 105, each client monitors the health of its signaling and media paths. The server also monitors the health of signaling and media to each client. In 106, B1 experiences a network connectivity problem that results in disruption to both the signaling and media paths. This causes both Clients 101 and 103 to not hear each other. Client B starts to automatically reconnect the call, but while this reconnection occurs, both Clients A and B are informed to provide the feedback to wait while the reconnection attempt is in progress. Failure to provide this feedback may result in users hanging up the call in user frustration. In some implementations, dropping the call due to temporary network connectivity problems or users hanging up due to lack of proper feedback can worsen the experience by ending up with each user calling the other at the same time and each going to voicemail of the other.

In the innovation, each user, not just one side, is presented with both a visual and audible alert. In 107, Client A is alerted that Client B is reconnecting while in 108, Client B is alerted that he/she is experiencing a problem and that a reconnection attempt is in progress. The visual indicator may be an animated circle around the avatar of the other person as shown in FIG. 2. In addition to the visual indicator, it's important to have an audible tone or message. The audible tone or recorded message to notify the user becomes most important in several cases: someone is driving or using a Bluetooth device with the client screen not directly in front of them; or answering a call over a locked screen on some mobile manufacturers, such as iOS with the use of CallKit where you can't see the visual indicator unless you unlock the screen with a password, passcode, fingerprint etc. The audio alert may start with a recorded message, such as 'trying to reconnect' and then periodic tones/beeps until the reconnection is successful or aborted due to elapse of the maximum duration for a reconnect attempt.

In 109, Client B's network connectivity is restored and the call is re-established. This results in the server informing both clients to cancel the alerts in 110 and 111 and resume the conversation. In FIG. 3, 101 is a client A device (named A1), 102 is a Server, 103 and 304 are for two devices used by Client B (named B1 and B2). Multiple devices may be in the form of mobiles, iPads, web applications etc. This flow assumes a previously established call in 305 where B had called A, which may be established via a protocol, such as WebRTC for media (audio) and websockets for signaling, but the claims are applicable for any other protocol. In 306, each client monitors the health of its signaling and media paths. The server also monitors the health of signaling and media to each client. In 307, Client B's device B1 experiences a battery depletion that results in disruption to both the signaling and media paths. This example uses a battery depletion, but it could be any type of network disruption, such as network connectivity problems in WiFi or cellular. This disruption causes both Clients 101 and 103 to not hear each other. In 308, client A is informed that a reconnection attempt to B is in progress to keep him/her engaged. In 309, the server's brief timer to wait for B to reconnect on its own expires, therefore in 310, the server starts calling B. This call looks like A is calling B even though the original call was made from B to A. This results in B's devices starting to ring. In 311, Client B answers the call from another device, B2. Once the call is answered by device B2, the signaling and media paths are re-established and connected to the original call where Client A is waiting on B. Client A was provided the feedback in 308 about the reconnection of the call, but is unaware about how the reconnection is performed; i.e. client devices from B reconnecting to the server or the server reaching out to B and ringing its devices. This method of the server initiating the reconnection allows one to easily switch to another available device should the battery deplete on one device or a network disruption occurs on the currently used device. It's not necessary that a different device for the client always answer the call; if it's not a battery depletion and the device regains network connectivity, it will also be eligible to answer the call the same way as a another device does. Once the media and signaling paths are restored for Client B, in 312, Client A is sent a message to cancel the alert and the two clients can resume the conversation.

In FIG. 4, 101 is a client A device (named A1), 102 is a Server, 103 and 304 are for two devices used by Client B (named B1 and B2). Multiple devices may be in the form of mobiles, iPads, web applications etc. This flow assumes a previously established call in 405 where A had called B, which may be established via a protocol, such as WebRTC for media (audio) and websockets for signaling, but the claims are applicable for any other VoIP protocol. In 406, each client monitors the health of its signaling and media paths. The server also monitors the health of signaling and media to each client. In 407, Client B's device B1 experiences a battery depletion that results in disruption to both the signaling and media paths. This example uses a battery depletion, but it could be any type of network disruption, such as network connectivity problems in WiFi or cellular. This disruption causes both Clients 101 and 103 to not hear each other. In 408, client A is informed that a reconnection attempt to B is in progress to keep him/her engaged.

In 409, client B uses another device, B2, to call A. Since A is already waiting for B with a reconnection indicator, the server uses the call attempt from B to A to join the two calls together in 410. Even though the original call started with A calling B, on the reconnection attempt, B calls A with a second device and joins the same call. This scenario uses an example of the battery depleting on the device B1, but it may have been for any other reasons, including network disruptions to device B1. This allows a multi-device scenario where a user can reconnect from another device to the same call and resume the conversation.

Once the media and signaling paths are restored for Client B, in 411, Client A is sent a message to cancel the alert and the two clients can resume the conversation.

In FIG. 5, 101 is a client A device (named A1), 102 is a Server and 103 is a client B device (named B1). This flow assumes a previously established call in 504 where A had called B, which may be established via a protocol, such as WebRTC for media (audio) and websockets for signaling, but the claims are applicable for any other VoIP protocol. In 505, each client monitors its signaling and media path health. The server also monitors the health of signaling and media to each client. In 506, Client B's device B1 experiences a network connectivity issue that results in disruption to both the signaling and media paths. This disruption causes both Clients 101 and 103 to not hear each other. In 507, client A is informed that a reconnection attempt to B is in progress to keep him/her engaged. In 508, client A decides to hang up the call and call B again, perhaps due to impatience waiting for B to reconnect. Client B also hangs up the call in 509. Client B also decides to call Client A at the same time. In most systems, including telephony calling on cell phones, this collision results in both clients being forwarded to each other's voicemail. This innovation results in a significantly better user experience where the simultaneous call attempts from A to B and B to A are seamlessly bridged in 512. From A's perspective, it appears that A called B and B answered while from B's perspective, it appears that B called A and A answered. This seamless bridging provides the intended user experience of both parties talking to each other without having to call each other again or be routed to voicemail. This bridging is possible because the server knows that A wants to talk to B and B wants to talk to A, therefore it can join the two call attempts on the server.

For this bridging to occur, if multiple servers are involved, the call attempts need to be centrally shared in a repository, such as via a database, so that it can recognize that A is calling B and B is calling A at the same time.

DETAILED DESCRIPTION

VoIP calling typically involves a signaling and a media (bearer) path. Signaling can be in-band with media or out-of-band. A protocol such as WebRTC is optimized for media and the signaling path is out-of-band. Furthermore, VoIP calling can be implemented as peer-to-peer between clients or with a server in the middle between the clients. We assume a client-server architecture, but the same applies for peer-to-peer architectures. Regardless of the method used for signaling and media or the architecture of peer to peer or via a server, there are multiple problems that need to be solved to provide call continuity and a better user experience compared to existing methods: I. Detection of poor network conditions and network transitions II. Alerting users of automatic reconnect attempts to keep users engaged III. Automatic reconnection when connectivity is lost IV. Call "bridging"

Detection:

The server performs periodic application heartbeats to a client. This heartbeat is best done with a lightweight protocol on top of the transport, such as websocket pings (RFC 6455). The server and client each monitor the media path. If network problems are experienced and media is not received on client A, it would mean the client B on the other end is not hearing what A is saying or vice versa. This would require an automatic reconnection to provide the best user experience. At this point, if no indication is provided to both A and B that a reconnection is attempted, after some time period (e.g. 5 seconds), the odds are either A or B would hang up the call due to lack of feedback or progress. Providing feedback to users that an automatic reconnection attempt is in progress is important to keep the users engaged and informed.

Figure 1:
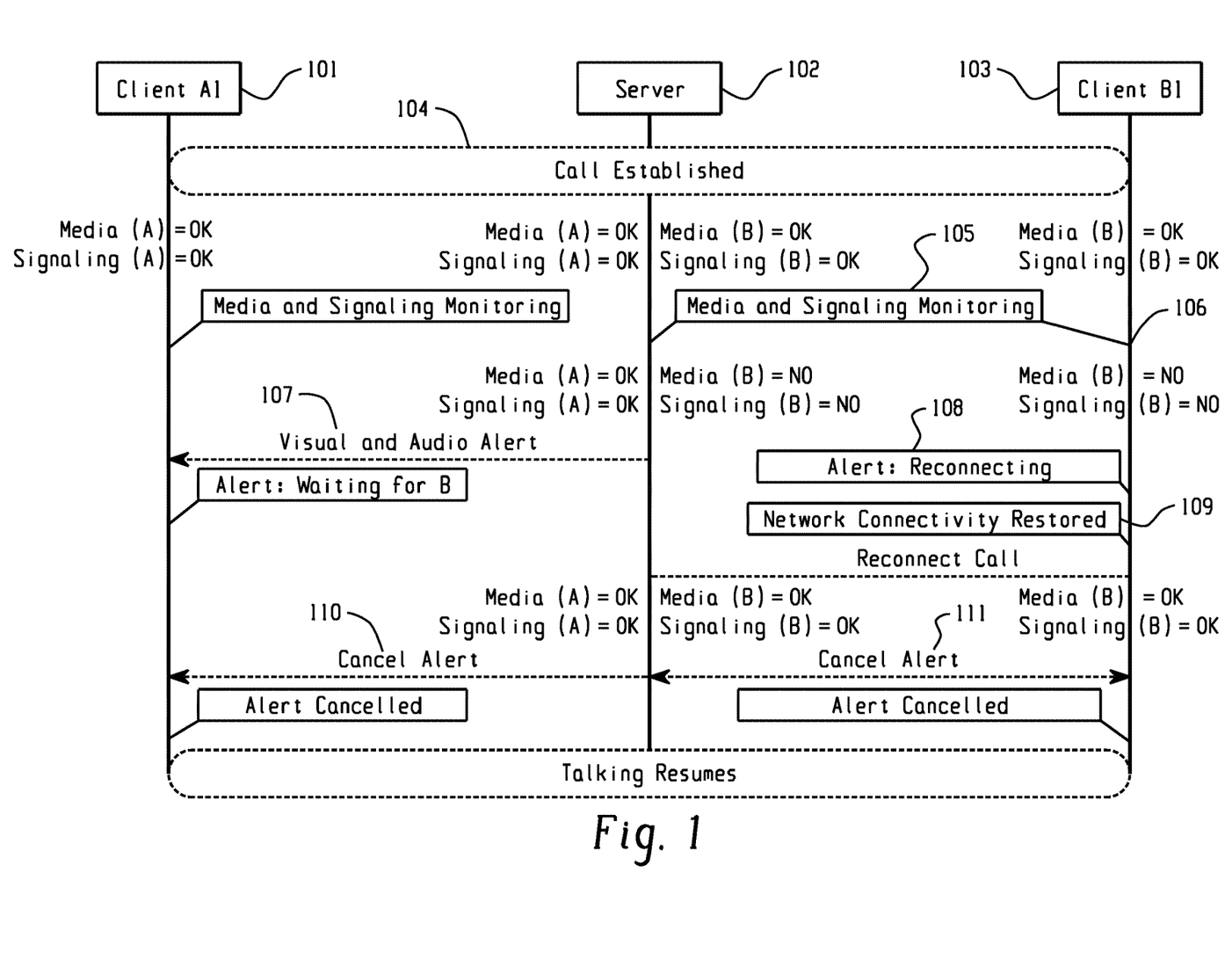
FIG. 1 shows a flow for using a visual and audible alert to keep users engaged while clients and servers attempt to reestablish a call that is experiencing problems.
Figure 2:
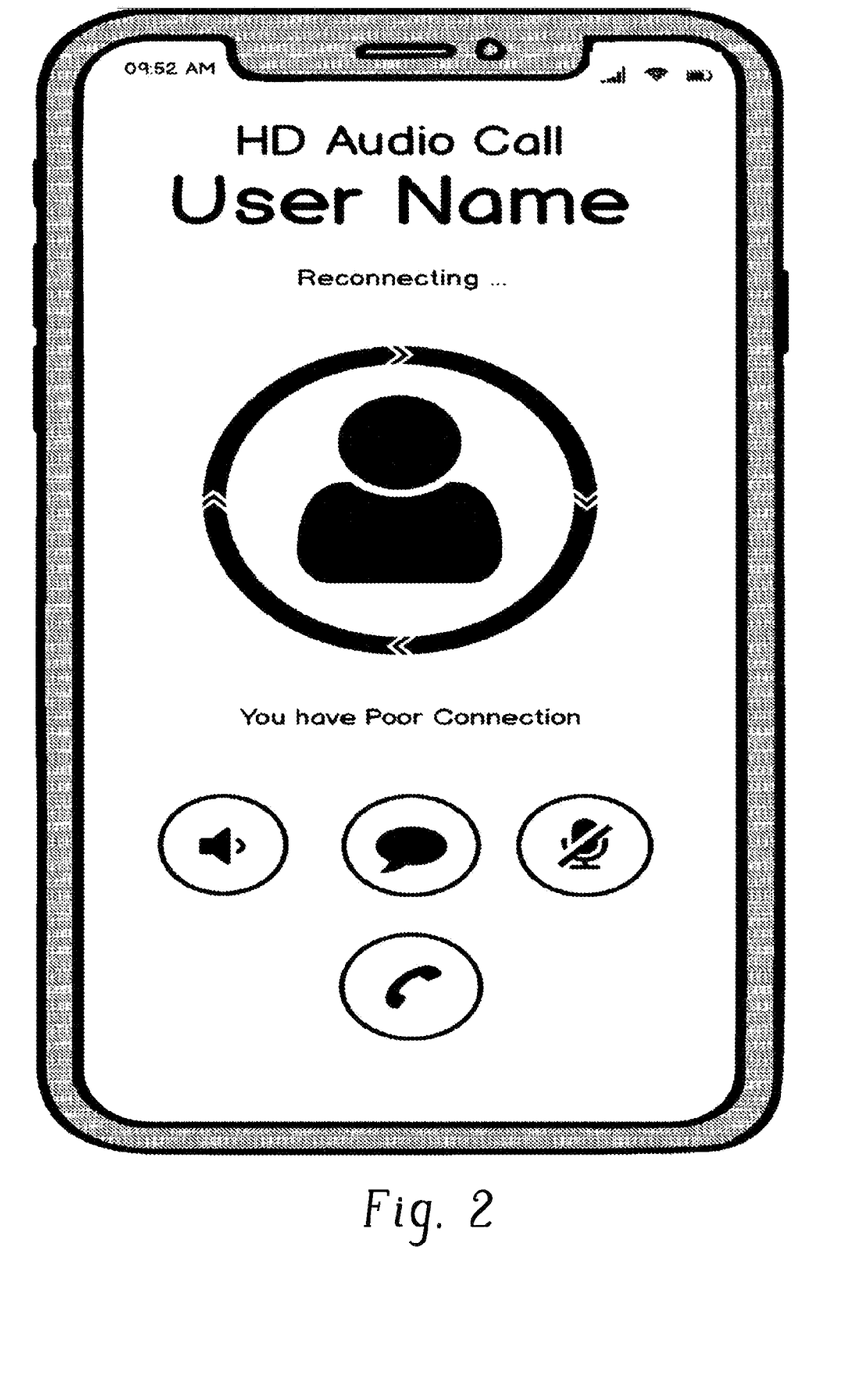
Figure 3:
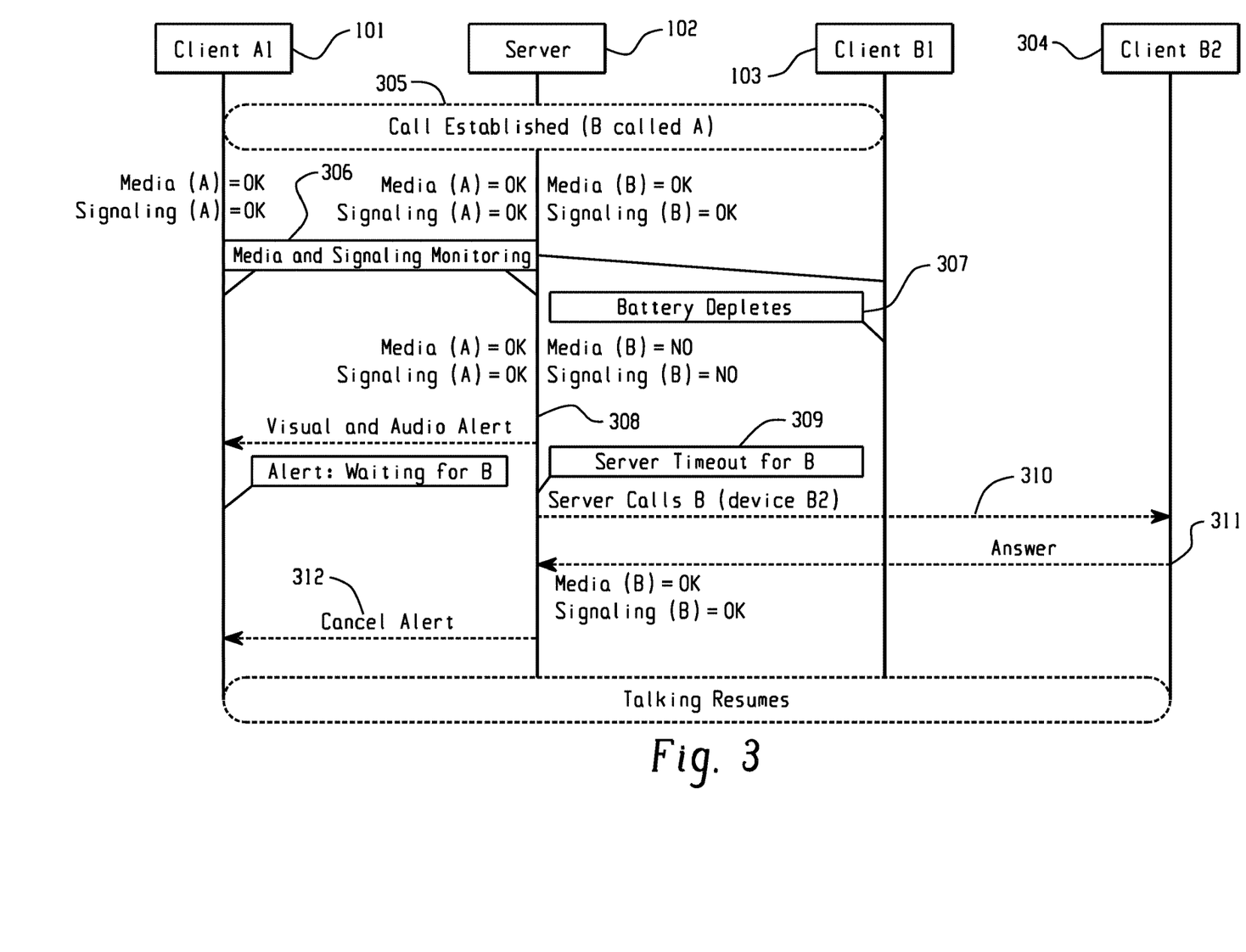
FIG. 3 shows a flow for a type of call reconnection that is initiated by the server with support for multiple devices.
Figure 4:
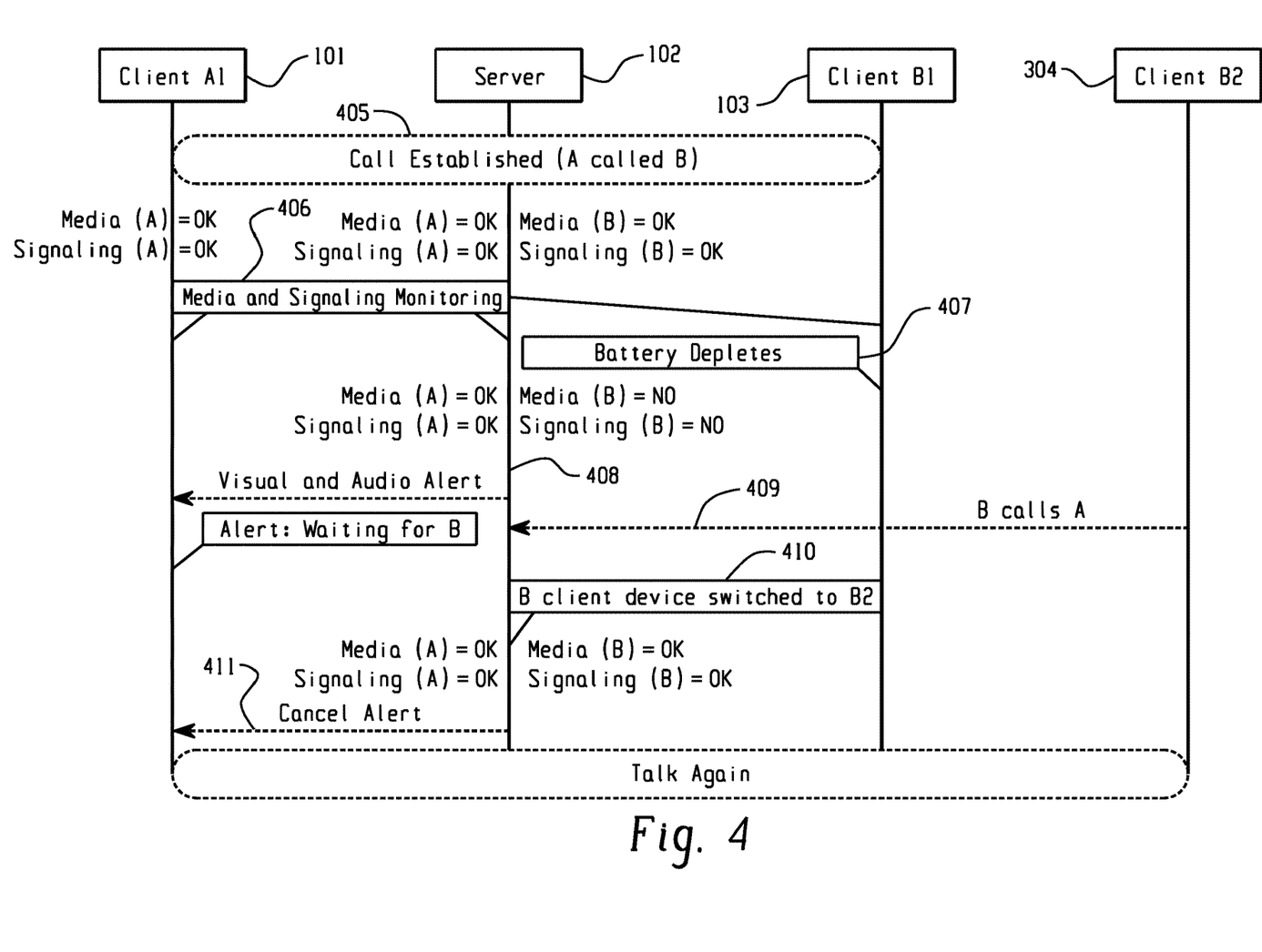
FIG. 4 shows a flow for a type of call reconnection that is initiated by the client with support for multiple devices.
Figure 5:
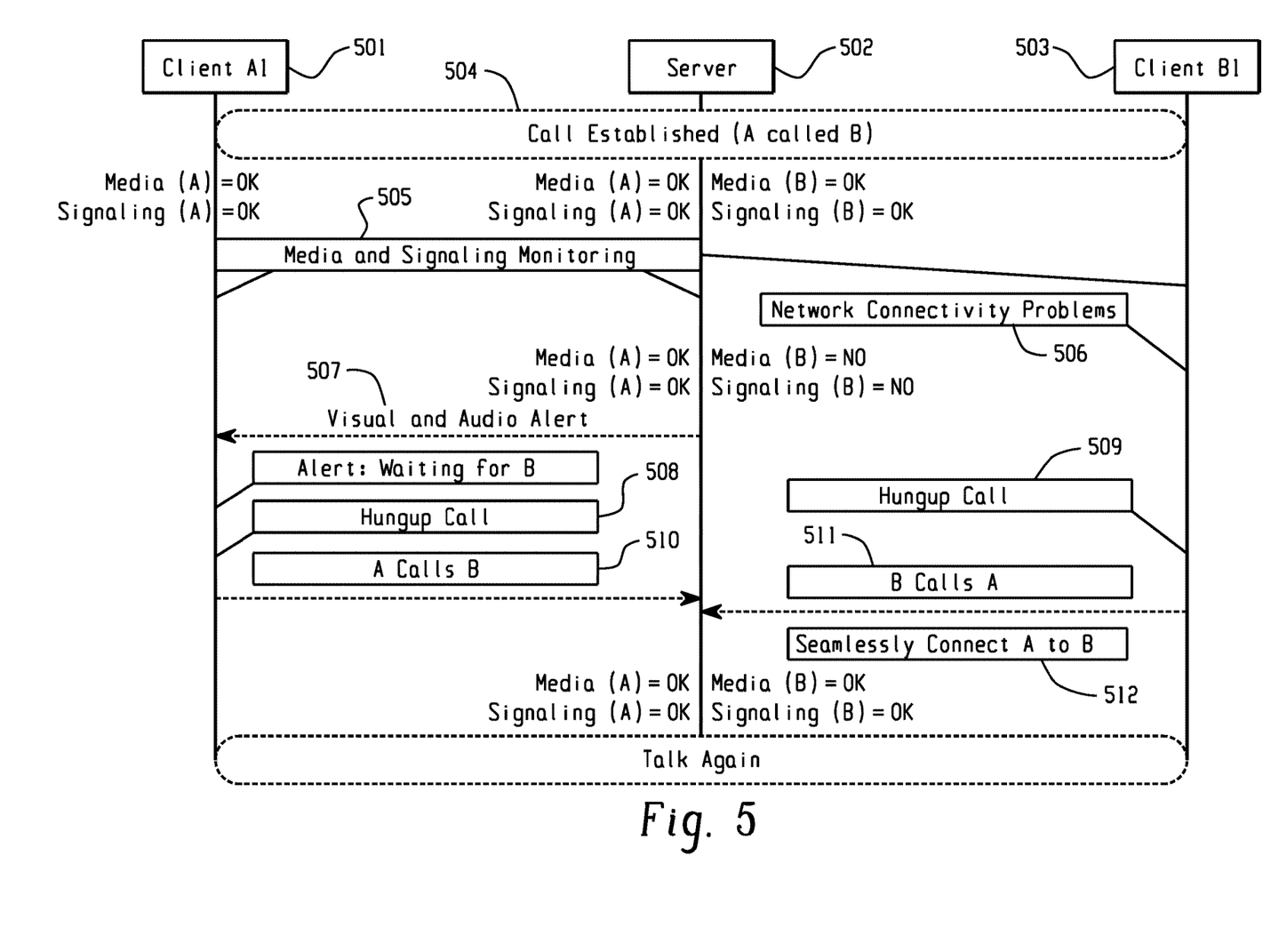
FIG. 5 shows a flow for a type of call reconnection that is initiated by the client with support for multiple devices.
Figure 6:
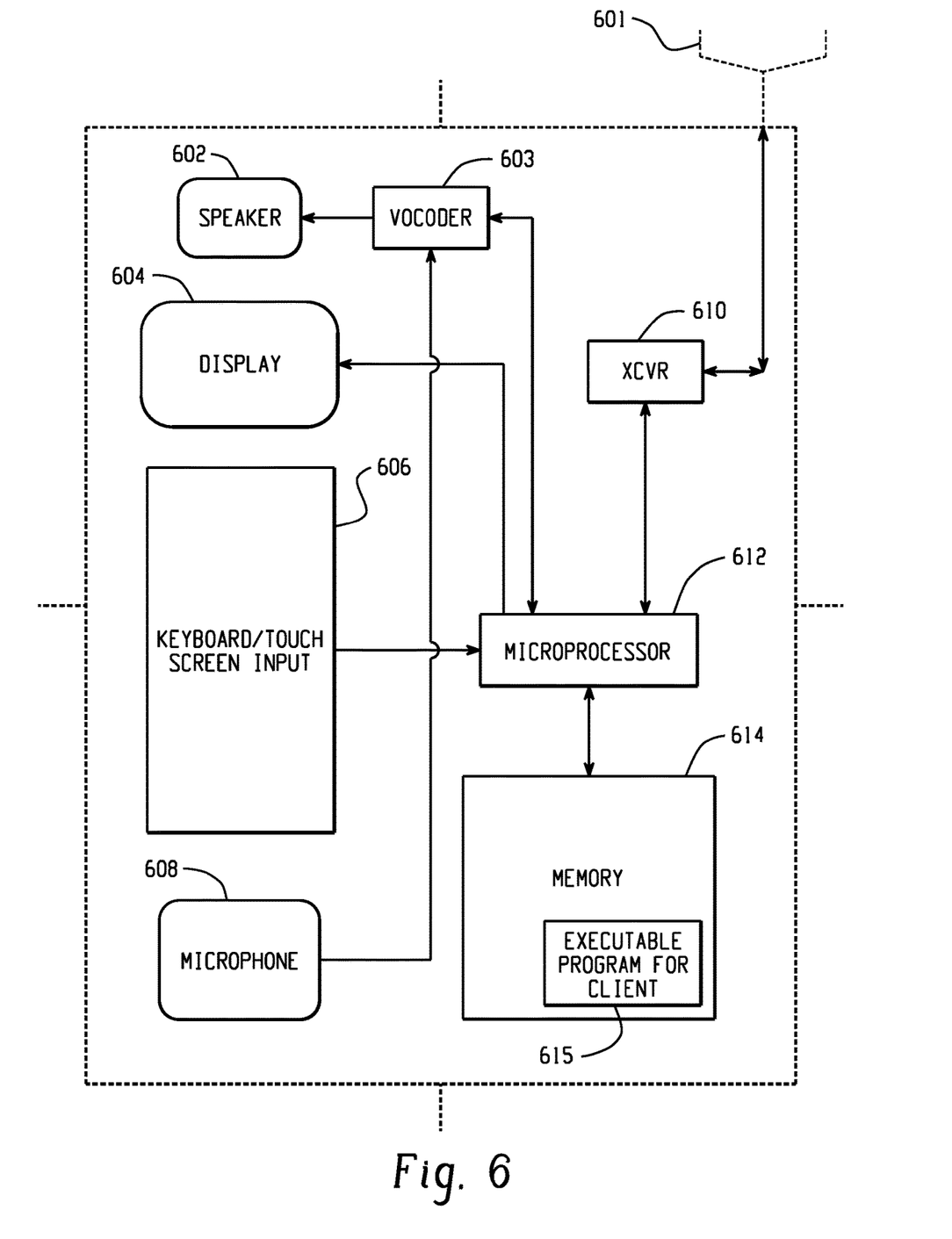
FIG. 6 shows an embodiment of the client device including software (615) resident in client memory (614) as well an antenna (601) which may connect the client to a radio access network.
Figure 7:
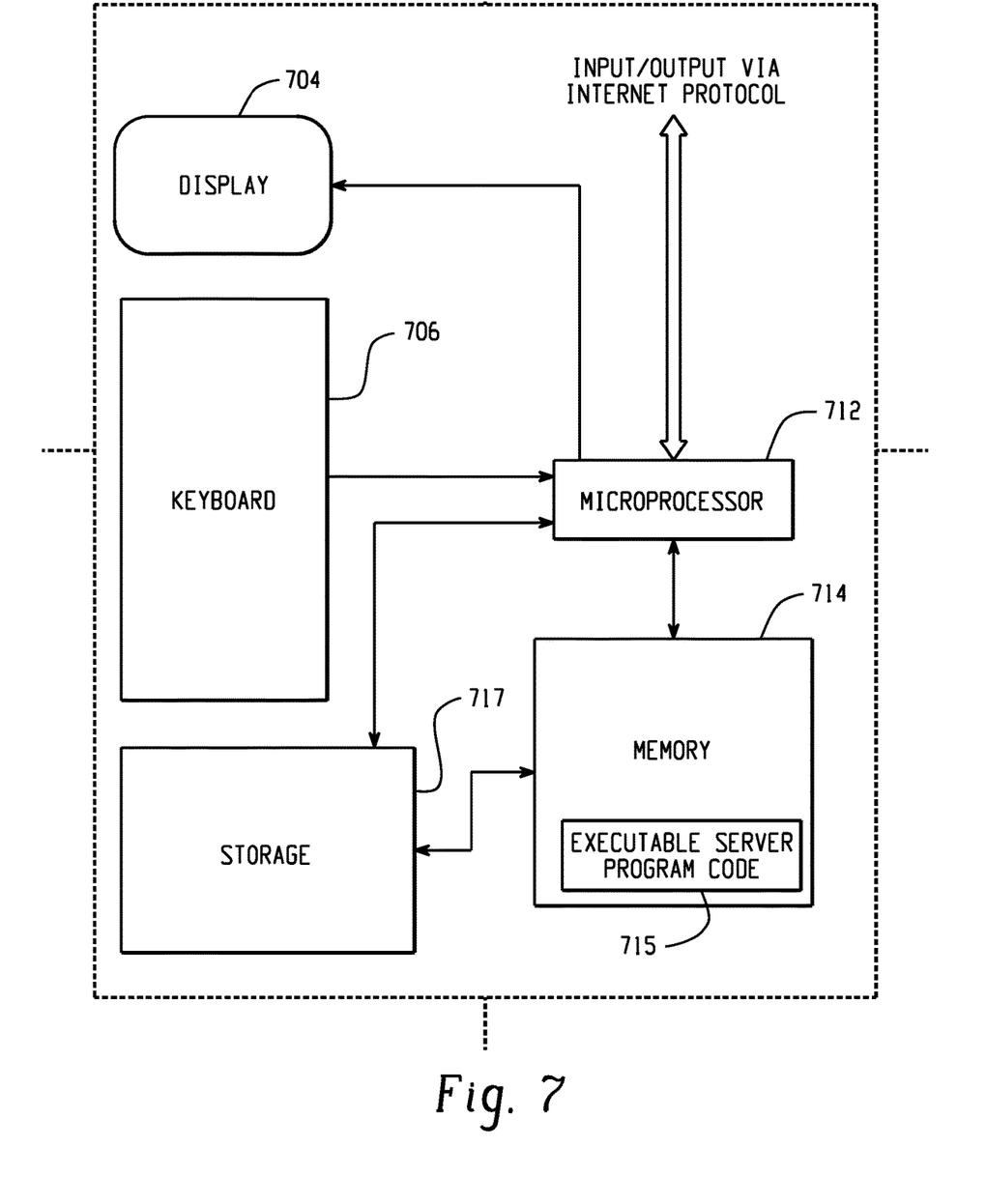
FIG. 7 shows an embodiment of the server device including internet protocol connectivity which can be used to connect the server to the radio access network as well as software (715) resident in server memory (714).

Alerting:

This application proposes a method with both visual and audible indications to keep the users engaged while the clients and server attempt to automatically reestablish the call. a. The method proposed has a visual indicator, such as an animation or a status bar indicating the party experiencing the problem and that a reconnect attempt is in progress. Since the server is able to conclusively know that for example A is the one experiencing the problem, it can notify the B client that it is waiting for A to reconnect. This also informs B that the problem is not on his/her side. Client A can also alert the user that it is trying to reconnect while it starts to automatically reconnect B. In addition to a visual indicator, it's important to have an audible tone or message. The audible tone or recorded message to notify the user becomes most important in several cases: someone is driving or using a Bluetooth device with the client screen not directly in front of them; or answering a call over a locked screen on some mobile devices, such as iOS with the use of CallKit where you can't see the visual indicator unless you unlock the screen with a password, passcode, fingerprint etc. FIG. 2 shows a sample of visual indicator that could accompany an audible tone.

Automatic Reconnection:

All automatic reconnect attempts are bounded to some reasonable amount of time, such as, for example, 30-60 seconds. During this time period, both the visual and periodic audible alerts are provided to keep the users engaged. At the end of the reconnect attempt period, the call is terminated and users are alerted that the reconnect attempt was unsuccessful. There are times when signaling is lost for some time, but media recovers, possibly so quick that makes it unnoticeable to users in conversation. This can be due to media paths optimized for temporary network disruptions, such as with use of the WebRTC protocol, but signaling may depend on protocols on top of TCP/IP. In such cases, no visual or audible tone is alerted to users because they can hear each other, however, the server can use heuristics based on data from the past and the presence of media that it is a temporary network disruption There are times when network transitions can occur, such as WiFi to cellular or vice versa, and signaling, media or both may be in an unrecoverable state (e.g. due to a change in IP address or network dependency changes). During these cases, it may require the call to drop and for the client to call again. This innovation proposes a better user experience. This sequence is used to explain this method:

I. A calls B and B answers;

II. While on the call, B experiences a network transition or an event that makes it unrecoverable;

III. The server will alert A that B is experiencing network problems, so audible and visual indications are provided to A on the reconnect attempt from B;

IV. The server initiates a new call to B with a caller identification of A. At this point, it is possible for B to answer this call on a different device (e.g. tablet vs. a mobile).

Another use case for this is when one device depletes the battery and another device is used to continue the call.

I. When B answers, the new call to B and the call in progress with A are seamlessly linked together;

II. Once the two calls are linked, the visual and audible reconnecting indications are stopped on A Call "bridging" While B is provided with a visual and audible reconnecting status of A, the A user may decide to hang up and call B. Since B is already waiting for A to reconnect, A's new call attempt should be seamlessly "bridged" to B and the conversation would resume. B would not know that A made another call attempt to B. Furthermore, to A, it would look like B answered the call as any other call is answered with user interaction, but when in fact, the bridging method makes it a seamless experience.

What is claimed:

1. A method to automatically reconnect voice over IP calls using a mobile message server apparatus comprising:

a storage device comprising computer executable program code;

a processor coupled to the storage device, and at least a client A1 and a client B1, wherein each client comprises a storage device comprising computer executable program code; and a processor coupled to the storage device, where the method to automatically reconnect further comprises:

the client A1 in use by User A, connected to the client B1 in use by User B in a voice over IP call by use of an intermediate server, wherein the intermediate server is configured to monitor a first signaling path health and a first media path health for the client A1 and a second signaling path health and a second media path health for the client B1, wherein the client A1 actively monitors the first signaling path health and the first media path health during the voice over IP call;

based on said monitoring by the intermediate server the first signaling path health and the first media path health for the client A1 and the second signaling path health and the second media path health for the client B1, the intermediate server determines the client B1 experiences a network problem based on the second media path health;

based on said determination by the intermediate server that the client B1 experiences a network problem, the intermediate server notifies the client A1 that User B is experiencing a network problem;

based on said determination by the intermediate server that the client B1 experienced the network problem, the intermediate server begins a timer for the client B1 to reconnect, wherein when the timer exceeds a time threshold and the client B1 has not reconnected, the intermediate server initiates a new connection with a client B2, wherein when the intermediate server determines that the client A1 or the client B1 have terminated the voice over IP call prior to the timer exceeding the time threshold, the intermediate server monitors the client A1 and the client B1 to detect a reconnection attempt;

based on the intermediate server monitoring the client A1 and the client B1 to detect the reconnection attempt, the intermediate server detects a first reconnection attempt from the client A1 and a second reconnection attempt from the client B1; and based on the detection of the first reconnection attempt from the client A1 and the second reconnection attempt from the client B1, the intermediate server bridges the first reconnection attempt and the second reconnection attempt to form a second voice over IP call.

2. The method of claim 1, wherein the client B1 is configured to automatically attempt to reconnect to the intermediate server after experiencing the network problem.

3. The method of claim 1, wherein the intermediate server is configured to ring a plurality of User B's devices simultaneously after the client B1 experiences the network problem.

4. The method of claim 1, wherein the client A1, the client B1, and the client B2 comprise a mobile device, a tablet device, or a voice over IP computer application.

5. The method of claim 1, wherein the client B1 actively monitors the second signaling path health and the second media path health.

6. The method of claim 5, wherein the client B1 automatically attempts to reconnect with the intermediate server upon determining the client B1 experiences the network problem based on the client B1 monitoring the second media path health.

7. The method of claim 1, wherein the intermediate server monitors the first media path health by applying a heartbeat to the client A1 and monitors the second media path health by applying a heartbeat to the client B1.

8. The method of claim 1, wherein the second voice over IP call is formed independent of user interaction with client A1 and independent of user interaction with client B1.

9. The method of claim 8, wherein when the second voice over IP call is formed, the intermediate server is configured to portray to the client B1 that the second voice over IP call was formed based on a first user interaction from the User A with the client A1 and portray to the client A1 that the second voice over IP call was formed based on a second user interaction from the User B with the client B1.

10. A mobile message server comprising:
a storage device comprising computer executable program code; and
a processor coupled to the storage device, wherein the processor executes the computer executable program code, the computer executable program code comprising instructions for:
monitoring a first signaling path health and a first media path health for a first client and a second signaling path health and a second media path health for a second client during a voice over IP call;
based on said monitoring by the mobile message server, determining the second client experiences a network problem based on the second signaling path health;
based on said determination by the mobile message server, the mobile message server notifies the first client that the second client is experiencing a network problem;
based on said determination by the mobile message server that the second client experienced the network problem, the mobile message server begins a timer for the second client to reconnect;
based on the mobile message server detecting that the second client reconnected to the mobile message server within a predetermined time threshold, the mobile message server actively monitors the second signaling path health and the second media path health for the second client;
based on the mobile message server detecting that the first client or the second client have terminated the voice over IP call within the time threshold, the mobile message server monitors the first client and the second client to detect a reconnection attempt;
based on the reconnection attempt by the first client and the reconnection attempt by the second client, the mobile message server bridges the reconnection attempt by the first client and the reconnection attempt by the second client to form a second voice over IP call.

11. The mobile message server of claim 10, wherein based on said notification from the mobile message server that the second client is experiencing a network problem, the mobile message server sends the first client a message to indicate by use of a visual or audio indicator to a user of the first client that the second client is experiencing a network problem.

12. The mobile message server of claim 11, wherein upon joining of the second client with the first client, the mobile message server sends the first client a message to cancel the visual or audio indicator in response to the mobile message server determining that the second signaling path and second media path are reestablished.

13. The mobile message server of claim 12, wherein upon receipt of the message to cancel the visual or audio indicator, the mobile message server sends the first client a message to remove the visual or audio indicator on the first client that the second client is experiencing a network problem.

14. The mobile message server of claim 11, wherein the visual or audio indicator includes a visual indicator.

15. The mobile message server of claim 10, wherein based on said monitoring by the mobile message server, the mobile message server determines the first client experiences a network problem based on the first signaling path health.

16. The mobile message server of claim 15, wherein after determining the first client experiences the network problem, the mobile message server attempts to call the first client to reestablish the call.

17. The mobile message server of claim 11, wherein the visual or audio indicator includes an audio message followed by a series of tones.

18. The mobile message server of claim 10, wherein in response to the second client calling the first client, the intermediate server bridges the call to reconnect the second client to the first client.

19. The mobile message server of claim 10, wherein the mobile message server monitors the first media path health by applying a heartbeat to the first client and monitors the second media path health by applying a heartbeat to the second client.

20. The mobile message server of claim 19, wherein the mobile message server applies the heartbeat to the first client using a series of websocket pings.

* * * * *